United States Patent [19]

Motohashi et al.

[11] Patent Number: 5,086,424
[45] Date of Patent: Feb. 4, 1992

[54] COMMUNICATION TERMINAL CONNECTION SYSTEM

[75] Inventors: Kazutoshi Motohashi, Tokyo; Takeshi Uehara, Tama; Takashi Matsumoto, Kawasaki, all of Japan

[73] Assignee: Fujitsu Limited, Kawasaki, Japan

[21] Appl. No.: 477,496

[22] Filed: Feb. 9, 1990

[30] Foreign Application Priority Data

Feb. 9, 1989 [JP] Japan ................................. 1-30858

[51] Int. Cl.$^5$ .............................................. H04R 11/04
[52] U.S. Cl. ....................................... 370/58.1; 370/112
[58] Field of Search ................... 370/58.1, 62, 65, 84, 370/100.1, 112; 340/825.5

[56] References Cited

U.S. PATENT DOCUMENTS

| | | | |
|---|---|---|---|
| 4,419,753 | 12/1983 | Kojima et al. | 370/62 |
| 4,445,211 | 4/1984 | Webber | 370/62 |
| 4,698,799 | 10/1987 | Amstutz et al. | 370/58.1 |
| 4,726,016 | 2/1988 | Uchida et al. | 370/62 |
| 4,855,999 | 8/1989 | Chao | 370/112 |
| 4,970,719 | 11/1990 | Takase et al. | 370/112 |

FOREIGN PATENT DOCUMENTS 139152 12/1986 Japan .
286351 3/1987 Japan .
47305 1/1988 Japan .

*Primary Examiner*—Douglas W. Olms
*Assistant Examiner*—Dang Ton
*Attorney, Agent, or Firm*—Staas & Halsey

[57] ABSTRACT

A communication terminal connection system couples at least one source terminals to a destination terminal via a line, and comprises a channel switch connected to the terminals, at least one multiplexer coupled to the channel switch which is coupled between the terminals and the multiplexer, and a control part coupled to the channel switch for switching and controlling a connection of the channel switch. The control part includes a first detection part for detecting a request-to-use information which is received from a source terminal and requests use of the multiplexer, a second detection part for detecting an identification number to which the multiplexer is coupled via the line when the first detection part detects the request-to-use information, and a connection part for detecting a destination identification number of the destination terminal which is received from the source terminal following the request-to-use information and for controlling the channel switch to couple the source terminal to the multiplexer when the destination identification number matches the identification number detected by the second detection part, thereby coupling the source terminal to the destination terminal via the line.

22 Claims, 14 Drawing Sheets

FIG.5

| UNIT NO. | IN-USE FLAG | CONNECTED DIAL NO. | CONNECTED NO. |
|---|---|---|---|
| $E_1$ | 1 | | 0 |
| $E_2$ | 1 | | 0 |
| $E_3$ | 1 | | 0 |
| ⋮ | ⋮ | ⋮ | ⋮ |
| $E_i$ | 0 | 0447771111 | 3 |
| ⋮ | ⋮ | ⋮ | ⋮ |
| $E_n$ | 1 | | 0 |

FIG. 13

| UNIT NO. | IN-USE FLAG | CONNECTED DIAL NO. | CONNECTED SPEED |
|---|---|---|---|
| $E_1$ | 1 | | 0 |
| $E_2$ | 1 | | 0 |
| $E_3$ | 1 | | 0 |
| ⋮ | ⋮ | ⋮ | ⋮ |
| $E_i$ | 0 | 044777111 | 2400 |
| ⋮ | ⋮ | ⋮ | ⋮ |
| $E_n$ | 1 | | 0 |

COMMUNICATION TERMINAL CONNECTION SYSTEM

BACKGROUND OF THE INVENTION

The present invention generally relates to communication terminal connection systems, and more particularly to a communication terminal connection system which connects a terminal which is designed for a low-speed communication and a terminal which is designed for a high-speed communication. The communication terminal connection system provides a degree of freedom in making a connection between a terminal and a multiplexer which multiplexes communication data from the terminal and outputs multiplexed communication data to a high-speed line.

In order to reduce an integrated services digital network (ISDN) to practice, multiplexers in conformance with the CCITT recommendations V.120 are being developed. The multiplexer (or terminal adaptor) multiplexes communication data from terminals which are designed for a low-speed communication and outputs a multiplexed communication data to a high-speed line such as a public line. In order to improve the practical functions of such a multiplexer, there is a need to improve the method of connecting the terminals and the multiplexer.

As described above, the multiplexer of an ISDN interface multiplexes the communication data from the terminals and outputs the multiplexed communication data to the high-speed line. FIG.1 shows one conventional method of connecting a multiplexer 2 on a transmission side and a multiplexer 2 on a reception side. A plurality of terminals 1 which are designed for low-speed communication are connected to the multiplexers 2. Each multiplexer 2 is connected to a public line network 4 via a public line 3a.

FIG.2 shows another conventional method of connecting a plurality of multiplexers 2 on the transmission side and the multiplexer 2 on the reception side. A private branch exchange 5 is provided between the multiplexers 2 on the transmission side and the public line 3a. One of the multiplexers 2 on the transmission side 15 connected to the public line 3a depending on a switching process of the private branch exchange 5.

But according to these conventional connecting methods, the terminal 1 and the multiplexer 2 are directly connected by a cable, and the connection between the terminal 1 and the multiplexer 2 is semi-fixed. For this reason, there is a problem in that the connection of the cable must be changed or a new multiplexer 2 must be provided when a terminal 1 needs to be newly connected. Moreover, there is a limit to the length of the cable which connects the terminal 1 and the multiplexer 2 when the signal attenuation is taken into account. For example, the length of the cable is limited to approximately 15 m in the case of the RS-232C standards. Hence, there is also a problem in that the terminals 1 which can use one multiplexer 2 in common must be arranged within a predetermined distance from each other. Furthermore, according to the conventional connecting method which uses the private branch exchange 5, there is a problem in that even when the multiplexer 2 is connected to a desired destination, a terminal 1 which is not connected to this multiplexer 2 cannot use the line to connect which is the desired destination.

SUMMARY OF THE INVENTION

Accordingly, it is a general object of the present invention to provide a novel and useful communication terminal connection system in which the problems described above are eliminated.

Another and more specific object of the present invention is to provide a communication terminal connection system for coupling at least one of first communication terminals to a second communication terminal via a line, the first communication terminals being designed for making a low-speed communication, the line being designed for making a high-speed communication, the communication terminal connection system comprising channel switch means connected to the first communication terminals, at least one multiplexer coupled to the channel switch means, the channel switch means being coupled between the first communication terminals and the multiplexer, and control means coupled to the channel switch means for switching and controlling a connection of the channel switch means. The control means including first detection means for detecting a request-to-use information which is received from the one first communication terminal and requests use of the multiplexer, second detection means coupled to the first detection means for detecting an identification number to which the multiplexer is coupled via the line when the first detection means detects the request-to-use information, and connection means for detecting a destination identification number of the second communication terminal which is received from the one first communication terminal following the request-to-use information and for controlling the channel switch means to couple the one first communication terminal to the multiplexer when the destination identification number matches the identification number detected by the second detection means, thereby coupling the one first communication terminal to the second communication terminal via the line. According to the communication terminal connection system of the present invention, it is possible to arbitrarily couple the first communication terminals and the multiplexer. Even when coupling a new first communication terminal to the multiplexer, there is no need to change the connection of cables or provide a new multiplexer. In addition, when there exists a multiplexer which is already coupled to the destination identification number, that same line can be used effectively for making a communication between the one first communication terminal and the second communication terminal.

Other objects and further features of the present invention will be apparent from the following detailed description when read in conjunction with the accompanying drawings.

BRIEF DESCRIPTION OF THE DRAWINGS

FIG. 5 shows a data structure of data stored in a multiplexer management table shown in FIG. 4;

FIG. 13 shows a data structure of data stored in the multiplexer management table used in the second embodiment;

DESCRIPTION OF THE PREFERRED EMBODIMENTS

Figure 1:
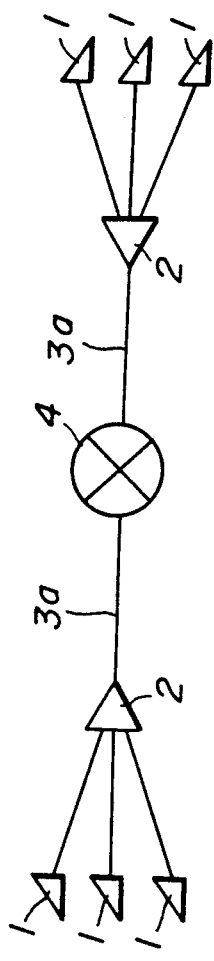
FIG. 1 is a system block diagram showing one conventional method of connecting multiplexers.
Figure 2:
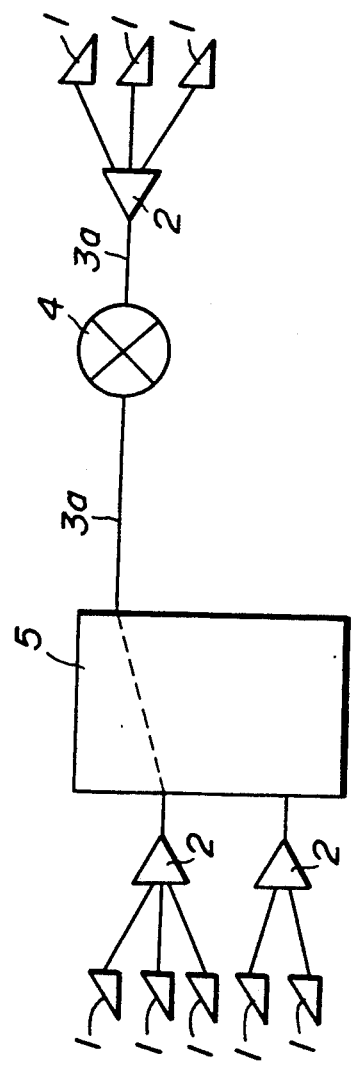
FIG. 2 is a system block diagram showing another conventional method of connecting illustrating
Figure 3:
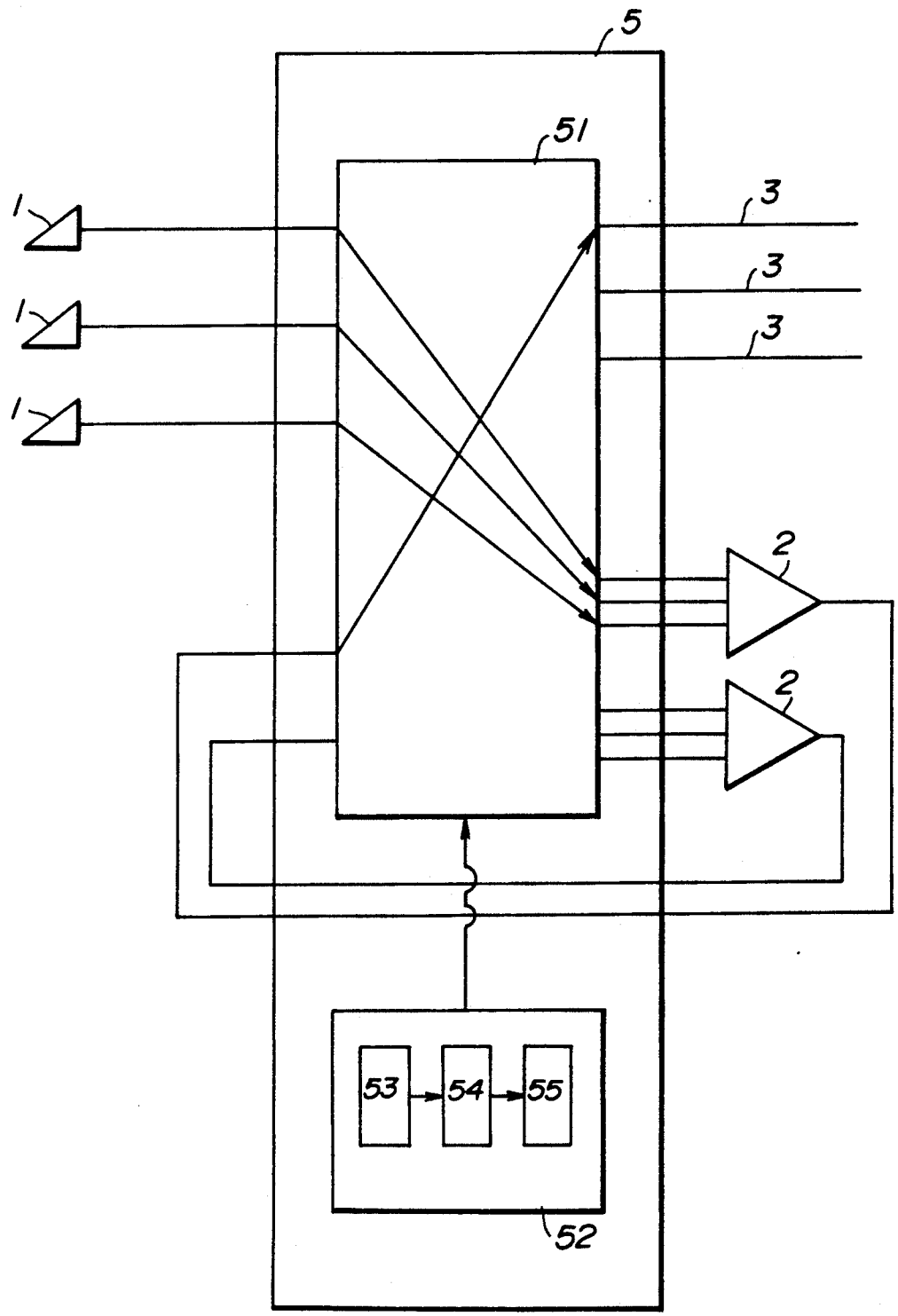
FIG. 3 is a system block diagram for-explaining an operating principle of a communication terminal connection system according to the present invention.

First, a description will be given of an operating principle of a communication terminal connection system according to the present invention, by referring to FIG. 3. In FIG. 3, those parts which are basically the same as those corresponding parts in FIG. 2 are designated by the same reference numerals. In FIG. 3, a plurality of terminals 1 are respectively designed to make a low-speed communication, and a plurality of multiplexers 2 are designed to multiplex input communication data from the terminals 1 and to output the multiplexed communication data. A private branch exchange 5 is connected to the terminals 1, the multiplexers 2, and high-speed lines 3 which are used when making a high-speed communication. The private branch exchange 5 includes a channel switch 51 and a control device 52.

The channel switch 51 switches the connection between the terminals 1 and the multiplexers 2 and also switches the connection between the multiplexers 2 and the high-speed lines 3. The control device 52 controls the switching process of the channel switch 51. The control device 52 includes a request existence detection means 53, a state detection means 54, and a connection process means 55. The request existence detection means 53 detects whether or not there is a request-to-use information which requests use of the multiplexer 2 from the terminal 1. The state detection means 54 detects an identification number of a terminal 1 which is connected to the multiplexer 2 which is in use when the request existence detection means 53 detects the request-to-use information. In this specification, the multiplexer 2 is said to be "in use" when the multiplexer 2 forms at least a portion of a path which connects a source terminal 1 and a destination terminal 1. When a destination identification number which follows the request-to-use information matches the identification number which is detected by the state detection means 54, the connection process means 55 connects the source to the destnation identification number. This connection is made provided that a connectable capacity of the multiplexer 2 is not exceeded. Otherwise, the connection process means 55 connects the source terminal 1 to an available multiplexer 2 which is not in use.

When sending the communication data to the high-speed line 3 using the multiplexer 2 in the communication terminal connection system according to the present invention, the user of the source terminal 1 first dials an information which represents the request-to-use information which requests use of the multiplexer 2 and then dials an identification number of a destination. When the request-to-use information is detected by the request existence detection means 53, the state detection means 54 first detects whether or not there exists a multiplexer 2 in use. Next, when there exists a multiplexer 2 in use, the state detection means 54 detects via the channel switch 51, an identification number of each terminal 1 which is connected to the multiplexer 2 via the high-speed line 3. Thereafter, when one of the detected identification numbers matches the identification number which is sent from the source terminal 1, the state detection means 54 detects a number of terminals 1 which are connected to this multiplexer 2.

When the state detection means 54 detects that there exists a multiplexer 2 which is connected to a terminal 1 having the destination identification number which is sent from the source terminal 1, and the source terminal 1 can be connected to this multiplexer 2, the connection process means 55 switches the channel switch 51 so as to connect the source terminal 1 to the multiplexer 2. Therefore, a connection is made between the source terminal 1 and the destination terminal 1.

On the other hand, the state detection means 54 may detect that no multiplexer 2 is connected to the terminal 1 having the destination identification number which is sent from the source terminal 1; or, that there exists a multiplexer 2 which is connected to the terminal 1 having the destination identification number which is sent from the source terminal 1, but the source terminal 1 cannot be connected to this multiplexer 2 because a maximum tolerable number of terminals 1 are already connected to this multiplexer 2 (that is, this multiplexer 2 is busy). In this case, the connection process means 55 switches the channel switch 51 so as to connect the source terminal 1 to an available multiplexer 2 which is not in use, and thereby a connection is made between the source terminal 1 and the destination terminal 1.

Therefore, a connection between the terminal 1 and the multiplexer 2 can be selected arbitrarily by use of the private branch exchange 5. Even when there is a need to connect a new terminal 1 to the multiplexer 2, it is unnecessary to change the connection of the cables or provide an independent multiplexer 2 for the new terminal 1. In addition, when there exists a multiplexer 2 which is connected to the same destination, any terminal 1 can use the same line to connect to the destination. Furthermore, by the provision of an interface circuit (not shown) within the private branch exchange 5, it is possible to set the length of the cable which connects the terminal 1 and the private branch exchange 5 in the order of km. As a result, the terminals 1 which can use the multiplexer 2 in common need not be arranged within a predetermined distance from each other.

Figure 4:
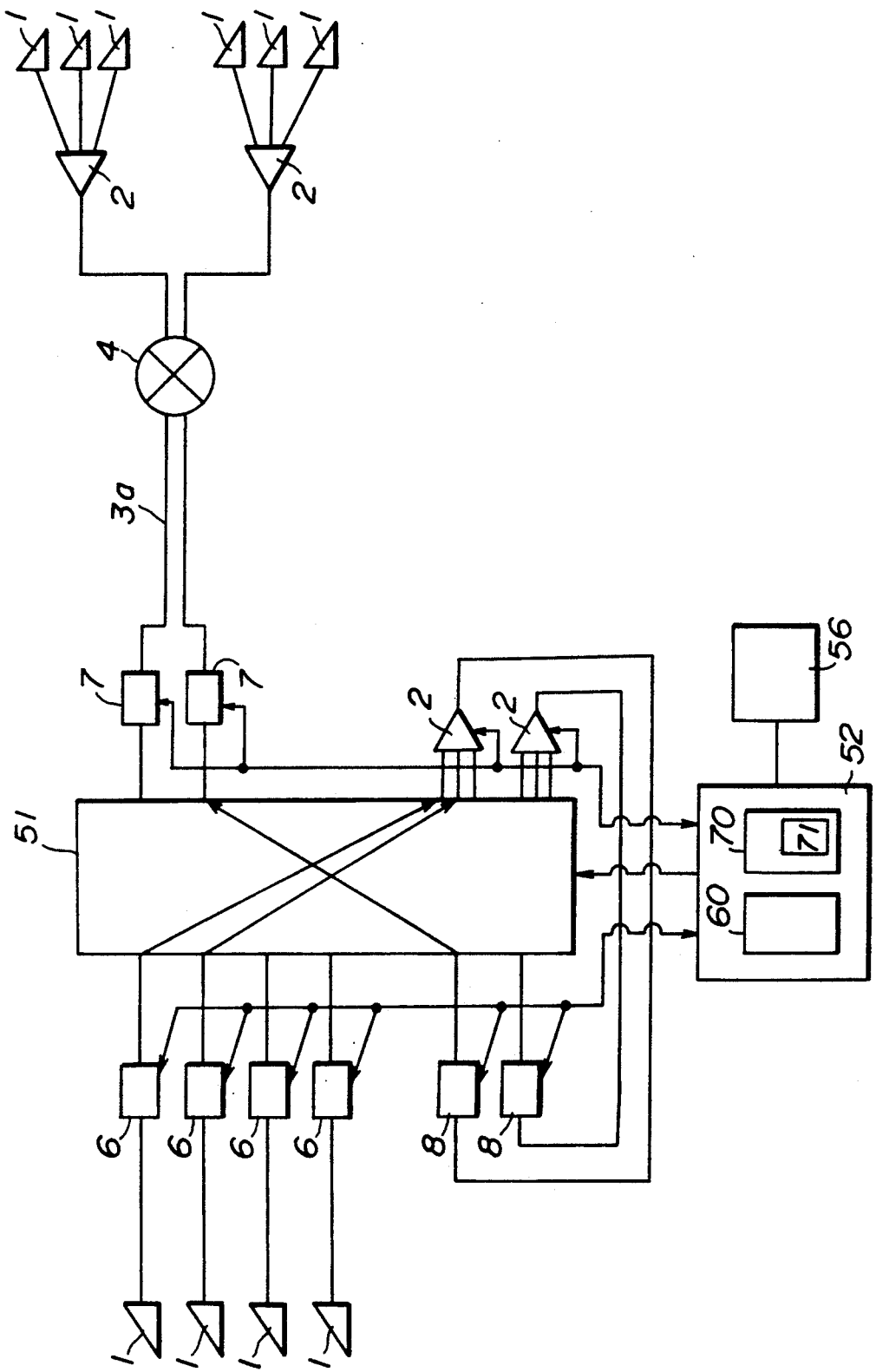
FIG. 4 is a system block diagram showing a first embodiment of the communication terminal connection system according to the present invention.

Next, a description will be given of a first embodiment of the communication terminal connection system according to the present invention, by referring to FIG. 4. In FIG. 4, those parts which are basically the same as those corresponding parts in FIG. 2 are designated by the same reference numerals. In FIG. 4, an interface circuit (or digital line circuit) 6 is provided between the terminal 1 and the channel switch 51. A trunk 7 is provided between the channel switch 51 and the public line 3a. An interface circuit 8 is provided between the multiplexer 2 and the channel switch 51. A memory 56 is connected to a controller 52 which comprises a connection control part 60 and a multiplexer management part 70. The connection control part 60 functions as the request existence detection means 53 and the connection process means 55 shown in FIG. 3. The multiplexer management part 70 functions as the state detection means 54 shown in FIG. 3. The multiplexer management part 70 includes a multiplexer management table 7I which is managed by the multiplexer management part 70 for carrying out the processes thereof.

As shown in FIG. 4, the channel switch 51 is used to connect the terminal 1 and the multiplexer 2. The channel switch 51 is also used to connect the output of the multiplexer 2 to the public line 3a. As a result, it is possible to connect the terminal 1 to the public line 3a. In addition, the connection between the terminal 1 and the multiplexer 2 is not semi-fixed as in the conventional case.

FIG. 5 shows a data structure of data stored in the multiplexer management table 71. In FIG. 5, the "unit number" data represents the unit number of the multiplexer 2 which is connected to the channel switch 51. The "in-use flag" data represents whether or not the multiplexer 2 identified by the unit number is in use. The "connected dial number" data represents the dial number of the terminal 1 to which the multiplexer 2 which is in use is connectecd. The "connected number" data represents the number of terminals 1 which are connected to the multiplexer 2 which is in use. In other words, the multiplexer management part 70 manages whether or not the multiplexer 2 is connected to the terminal 1 via the channel switch 51 and the public line network 4, is in use whether or not multiplexer 2 based on the data stored 15 in the multiplexer management table 71. When the multiplexer 2 is in use, the multiplexer management part 70 manages the dial number of the terminal 1 to which the multiplexer 2 is connected and also manages the number of terminals 1 which are connected to the private branch exchange 5.

In FIG. 5 for example, an ith multiplexer 2 having the unit number Ei has the "in-use flag" data "0" to indicate that the ith multiplexer 2 is in use. In addition, the "connected dial number" data "0447771111" indicates that the ith multiplexer 2 is connected to the terminal 1 having the dial number "044-777-1111", and the "connected number" data "3" indicates that the ith multiplexer 2 is used by 3 terminals 1.

Figure 6:
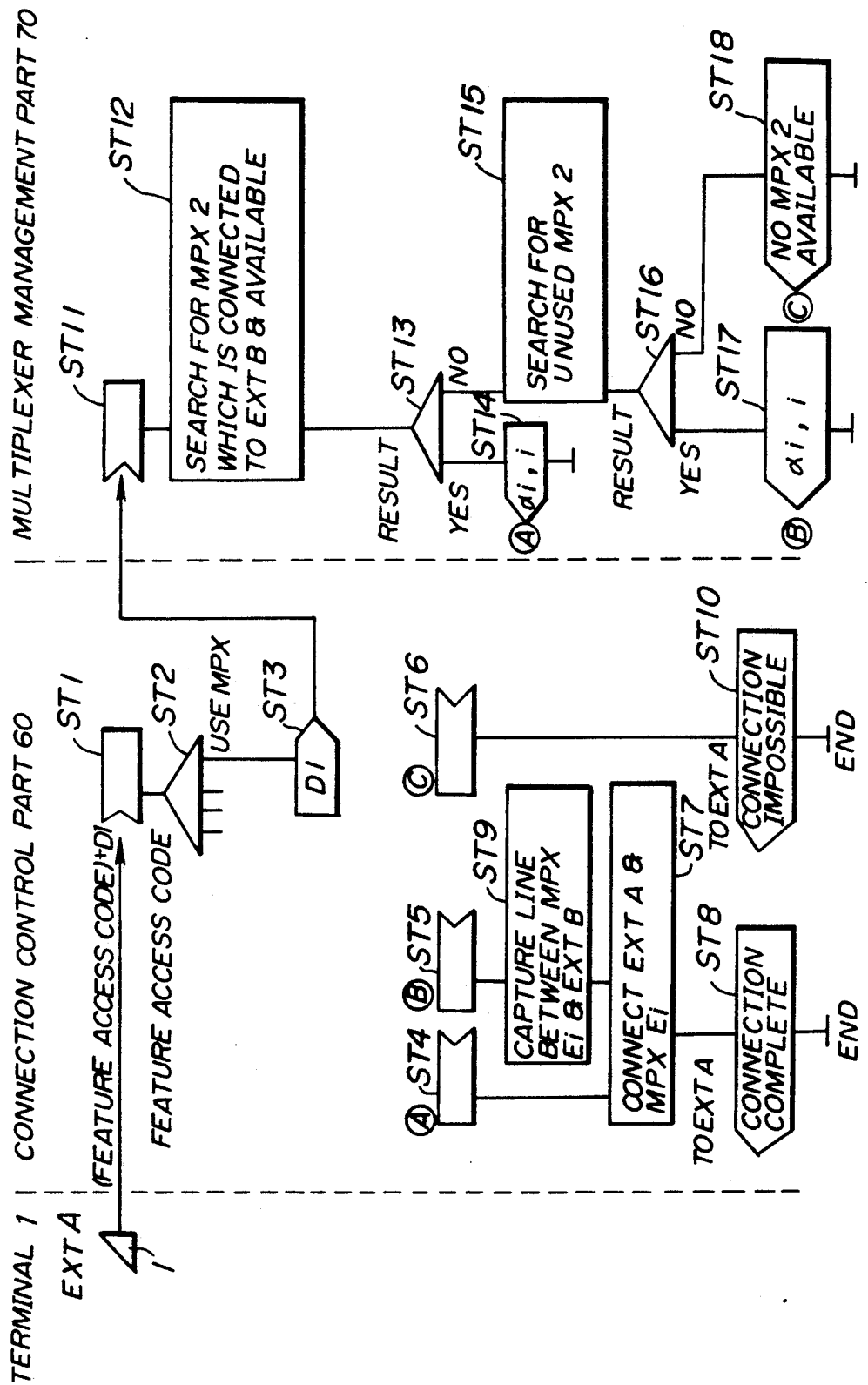
FIG. 6 is a flow chart showing a connection process between a source terminal and a public line during a call process of the first embodiment.
Figure 7:
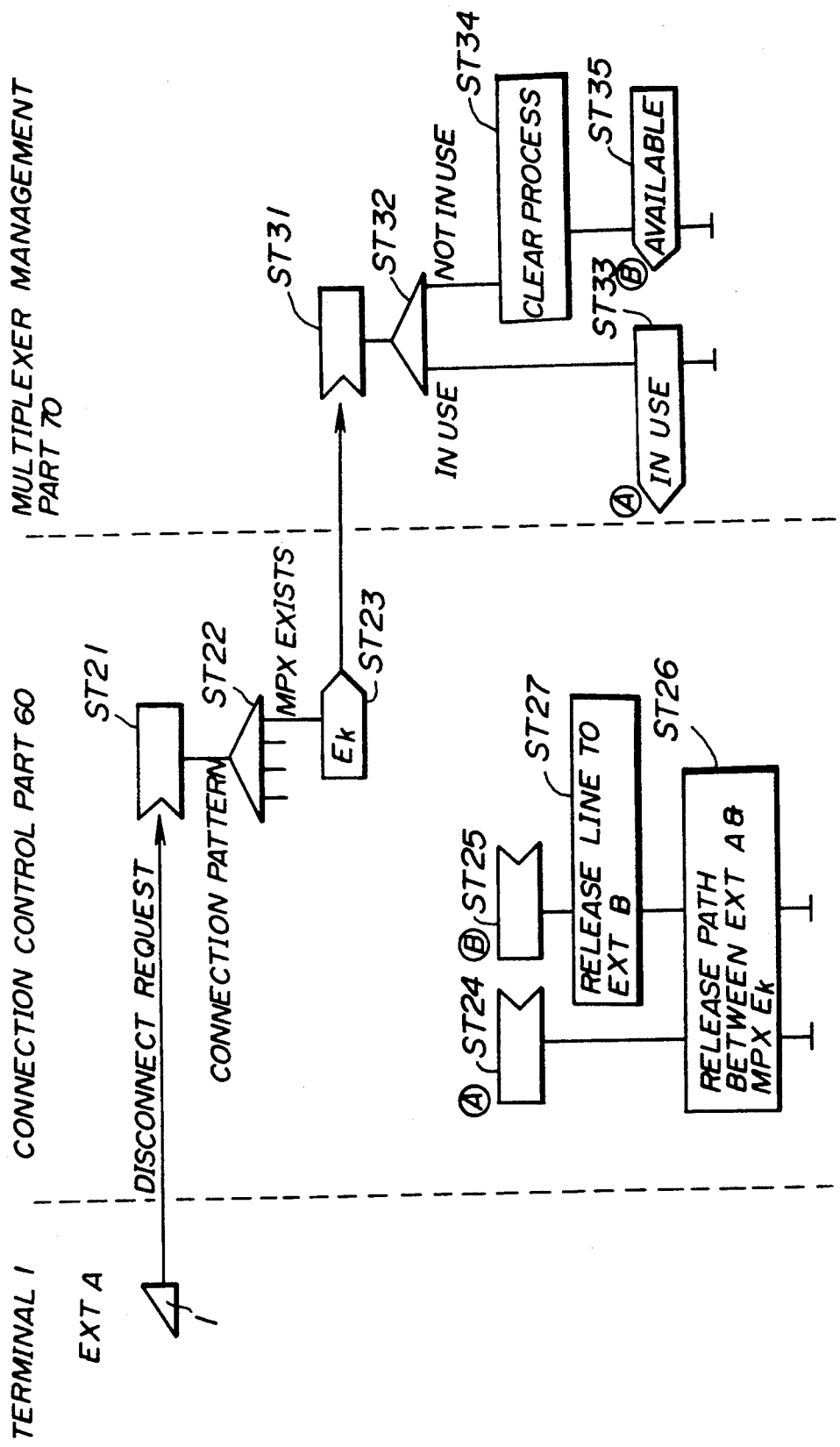
FIG. 7 is a flow chart showing a release process for releasing the connection between a destination terminal and the public line during the call process of the first embodiment.
Figure 8:
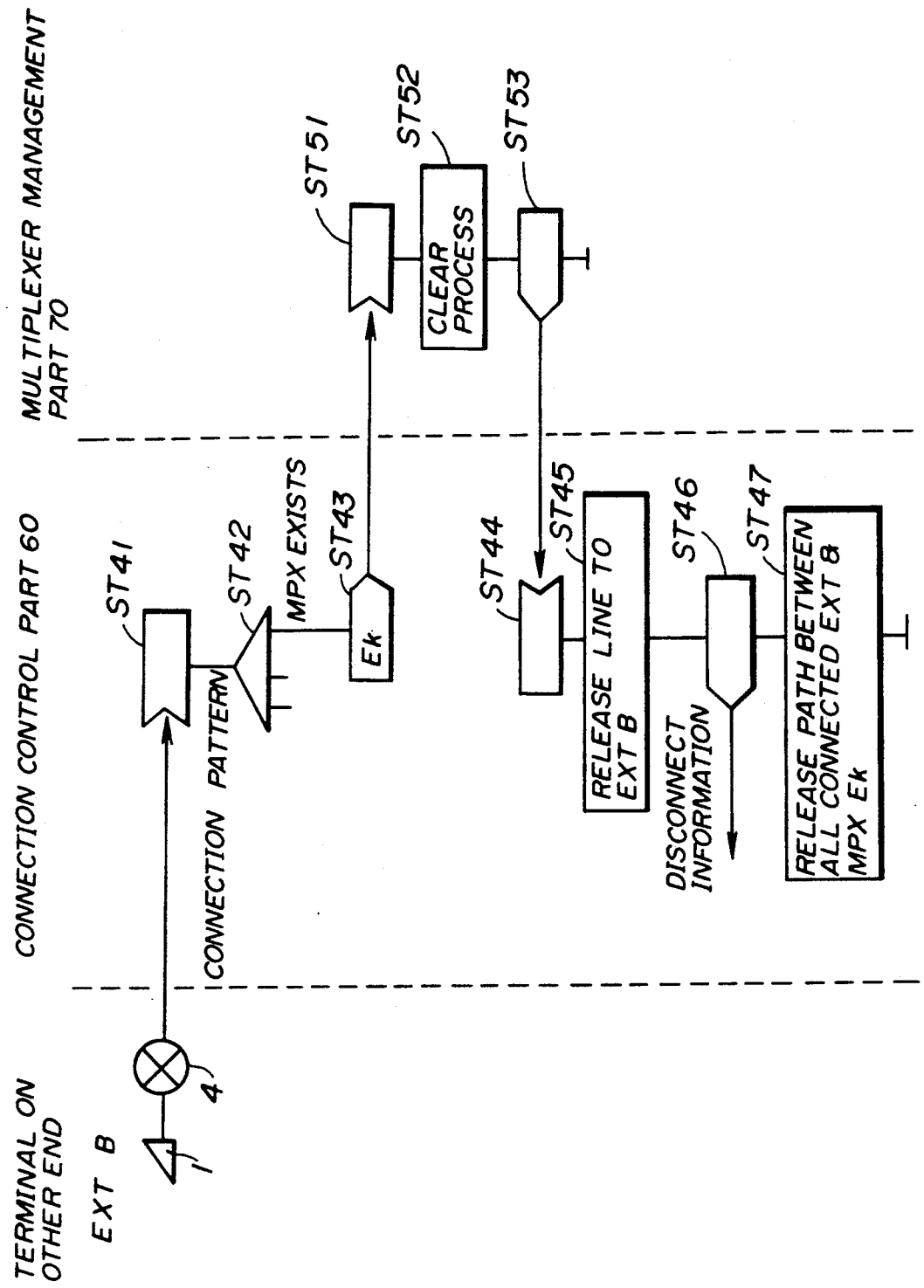
FIG. 8 is a flow chart showing a release process for releasing the connection in units of lines requested from the destination terminal in the first embodiment.

Next, a description will be given of the operation of the first embodiment by referring to flow charts of FIGS. 6 through 8. FIG. 6 shows a connection process between the source terminal 1 and the public line 3a during a call process. FIG. 7 shows a release process for releasing the connection between the destination terminal 1 and the public line 3a during the call process. FIG. 8 shows a release process for releasing the connection in units of lines requested from the destination terminal 1.

First, a description will be given of the connection process between the terminal 1 and the public line 3a by referring to the flow chart of FIG. 6. When the user wishes to send the communication data to the destination terminal 1 using the multiplexer 2, the user first dials a feature access code from the source terminal 1 which is indicated by an extension A in FIG. 6 and then dials a dial number Dl of the destination terminal 1. The feature access code indicates the request-to-use information which requests use of the multiplexer 2.

When the connection control part 60 receives the feature access code and the dial number Dl in a step ST1, a step ST2 selects out of a plurality of available services a service of the connection process depending on the feature access code. Depending on the selected service of the connection process, a step ST3 sends the received dial number Dl to the multiplexer management part 70. Thereafter, the connection control part 60 waits for a response from the multiplexer management part 70.

When the multiplexer management part 70 receiver the dial number D1 in a step ST11, a step ST12 searches the multiplexer management table 71 for a multiplexer 2 which is connected to the terminal 1 having the dial number D1 and that has connected thereto a number of terminals I smaller than a maximum tolerable number of terminals which can be connected to the multiplexer 2. A step ST13 discriminates whether or not a multiplexer 2 falls fulfills the conditions of the search carried out in the step ST12. When the discrimination result in the step ST13 is YES, a step ST14 sends to the connection control part 60 the data on the unit number $E_i$ of the multiplexer 2 and the data on the in-use flag $a_i$ of the multiplexer 2. The data on the in-use flag $a_i$ is sent to the connection control part 60 to indicate that the multiplexer 2 can be used. In addition, the step ST14 increments the "connected number" data for the multiplexer 2 in the multiplexer management table 71 in synohronism with the transmission process.

On the other hand, when the discrimination result in the step ST13 is NO, the multiplexer 2 which has the unit number $E_i$ is busy and a step ST15 searches the multiplexer management table 71 for a multiplexer 2 which is not busy. Then, a step ST16 discriminates whether or not a multiplexer 2 falls under the search carried out in the step ST15. When the discrimination result in the step ST16 is YES, a step ST17 sends to the connection control part 60 the data on the unit number $E_i$ of the multiplexer 2 and the data on the in-use flag $a_i$ of the multiplexer 2. Similarly to the step ST14 described above, the step ST17 increments the "connected number" data for the multiplexer 2 in the multiplexer management table 71 to "1" in synchronism with the transmission process. The step ST17 also sets the in-use flag $a_i$ to "0" to indicate that the multiplexer 2 is in use. But when the discrimination result in the step ST16 is NO, a step ST18 informs the connection control part 60 that no multiplexer 2 meets the conditions of the search carried out in the step ST15.

When the connection control part 60 receives the information from the step ST14 of the multiplexer management part 70 in a step ST4, a step ST7 controls the channel switch 51 to connect the source terminal 1 to the multiplexer 2 which has the received unit number.

By this connection process, the multiplexer 2 which is connected to the destination terminal 1 can be used immediately to connect the source terminal 1 to the destination terminal 1. Then, a step ST8 informs the source terminal 1 that the connection is complete.

In addition, when the connection control part 60 receives the information from the step ST17 of the multiplexer management part 70 in a step ST5, a step ST9 controls the channel switch 51 to connect the destination terminal 1 and the multiplexer 2 which has the received unit number. By this connection process, it is possible to capture a line between the destination terminal 1 and the multiplexer 2 which is not in use. Next, a step ST7 controls the channel switch 51 to connect the source terminal 1 and the multiplexer 2 which has the received unit number. By this connection process, the multiplexer 2 which is not in use is specified, and the source terminal 1 and the destination terminal 1 are connected. Then, the step ST8 informs the source terminal 1 that the connection is complete.

When the connection control part 60 receives the information from the step ST18 of the multiplexer management part 70 in a step ST6, a step ST10 informs the source terminal 1 that a connection cannot be made.

Therefore, according to this embodiment, the multiplexer 2 can be selected arbitrarily depending on the channel switch 51 of the private branch exchange 5. When there already exists a multiplexer 2 which is connected to the destination terminal 1, this multiplexer 2 is used to immediately connect the source terminal 1 to the destination terminal 1. In addition, by the provision of the interface circuit 6, it is possible to set the length of the cable which connects the terminal 1 and the private branch exchange 5 in the order of km. As a result, the terminals 1 which can use the multiplexer 2 in common need not be arranged within a predetermined distance from each other.

Next, a description will be given of the release process for releasing the connection between the the destination terminal 1 via the public line 3a. When the user wishes to disconnect the line which is connected to the destination terminal 1, the user of the source terminal 1 makes a disconnect request from the source terminal 1 which is indicated by the extension A in FIG. 7.

When the connection control part 60 receives the disconnect request in a step ST21, a step ST22 selects out of a plurality of available services a service of the disconnection process depending on the disconnect request. Depending on the selected service of the disconnection process, a step ST23 sends to the multiplexer management part 70 a unit number $E_k$ of the multiplexer 2 which is used by the source terminal 1. Thereafter, the connection control part 60 waits for a response from the multiplexer management part 70.

When the multiplexer management part 70 receives the unit number $E_k$ in a step ST31, a step ST32 searches the fultiplexer management table 71 for another terminal 1 which is using the multiplexer 2 which has the unit number $E_k$. When the discrimination result in the step ST32 is YES, a step ST33 informs the connection control part 60 of the multiplexer 2 which has the unit number $E_k$. The step ST33 also decrements the "connected number" data on the multiplexer 2 in the multiplexer management table 71 in synchronism with the transmission process. On the other hand, when the discrimination result in the step ST32 is NO, a step ST34 decrements and clears the "connected number" data on the multiplexer 2 in the multiplexer management table 71 to "0" in synchronism with the transmission process. In addition, the step ST34 sets the in-use flag to "1" to indicate that the multiplexer 2 which has the unit number $E_k$ is not in use. After the step ST34, a step ST35 informs the connection control part 60 that the multiplexer 2 which has the unit number $E_k$ is not in use "and is available.

When the connection control part 60 receives the information from the step ST33 of the multiplexer management part 70 in a step ST24, a step ST26 controls the channel switch 51 to disconnect the connection between + the source terminal 1 and the multiplexer 2 which is used by the source terminal 1. By this disconnection process, the connection between the source terminal 1 and the destination terminal 1 is disconnected without interfering with the processing of other terminals 1 which are using the same multiplexer 2.

When the connection control part 60 receives the information from the step ST35 of the multiplexer management part 70 in a step ST25, a step ST27 controls the channel switch 51 to disconnect the connection between the destination terminal 1 (indicated by an extension B) and the multiplexer 2 which has the unit number $E_k$ and is used by the source terminal 1. By this disconnection process, the line between the destination terminal 1 and the multiplexer 2 is disconnected. Next, the step ST26 controls the channel switch 51 to disconnect the connection between the source terminal 1 and the multiplexer 2 which has the unit number $E_k$ and is in use by the source terminal 1. As a result, all of the connections between the source terminal 1 and the destination terminal 1 are disconnected.

Hence, according to this embodiment, the line which is connected to the multiplexer 2 is disconnected depending on the channel switch 51 of the private branch exchange 5.

Next, a description will be given of the release process for releasing the connection in units of lines requested from the destination terminal 1; When the user wishes to disconnect the line which connects to the source terminal 1, the user of the destination terminal 1 makes a disconnect request from the destination terminal 1 which is indicated by the extension B in FIG. 8.

When the connection control part 60 receives the disconnect request in a step ST41, a step ST42 selects out of a plurality of available service a service of the disconnection process depending on the disconnect request. Depending on the selected service of the disconnection process, a step ST43 sends to the multiplexer management part 70 the unit number $E_k$ of the multiplexer 2 which is used by the source terminal 1. Thereafter, the connection control part 60 waits for a response from the multiplexer management part 70.

When the multiplexer management part 70 receives the unit number $E_k$ in a step ST51, a step ST52 searches the multiplexer management table 71 to clear the "connected number" data on the multiplexer 2 in the multiplexer management table 71 to "0". In addition, the step ST52 sets the in-use flag to "1" to indicate that the multiplexer 2 which has the unit number $E_k$ is not in use. After the step ST52, a step ST53 informs the connection control part 60 that the clear process with respect to the multiplexer management table 71 has ended.

When the connection control part 60 receives the information from the step ST53 of the multiplexer management part 70 in a step ST44, a step ST45 controls the channel switch 51 to disconnect the connection between the source terminal 1 and the multiplexer 2 which has the unit number $E_k$ and is used by the source terminal 1. Then, a step ST46 informs all of the terminals 1 located on the private branch exchange 5 and which are connected to the multiplexer 2 which has the unit number $E_k$ and is used by the source terminal 5 and that the disconnection process will be carried out. A step ST47 controls the channel switch 51 to disconnect the paths between the multiplexer 2 the unit number $E_k$ and all of the terminals 1 which are located on the private branch exchange 5 side. As a result, all of the connections between the source terminal 1 and the destination terminal 1 are disconnected.

Of course, the request-to-use information which requests use of the multiplexer 2 and is sent to the private branch exchange 5 is not limited to the feature access code. Other methods can be employed such as utilizing a call set up message of an ISDN signal.

Figure 9:
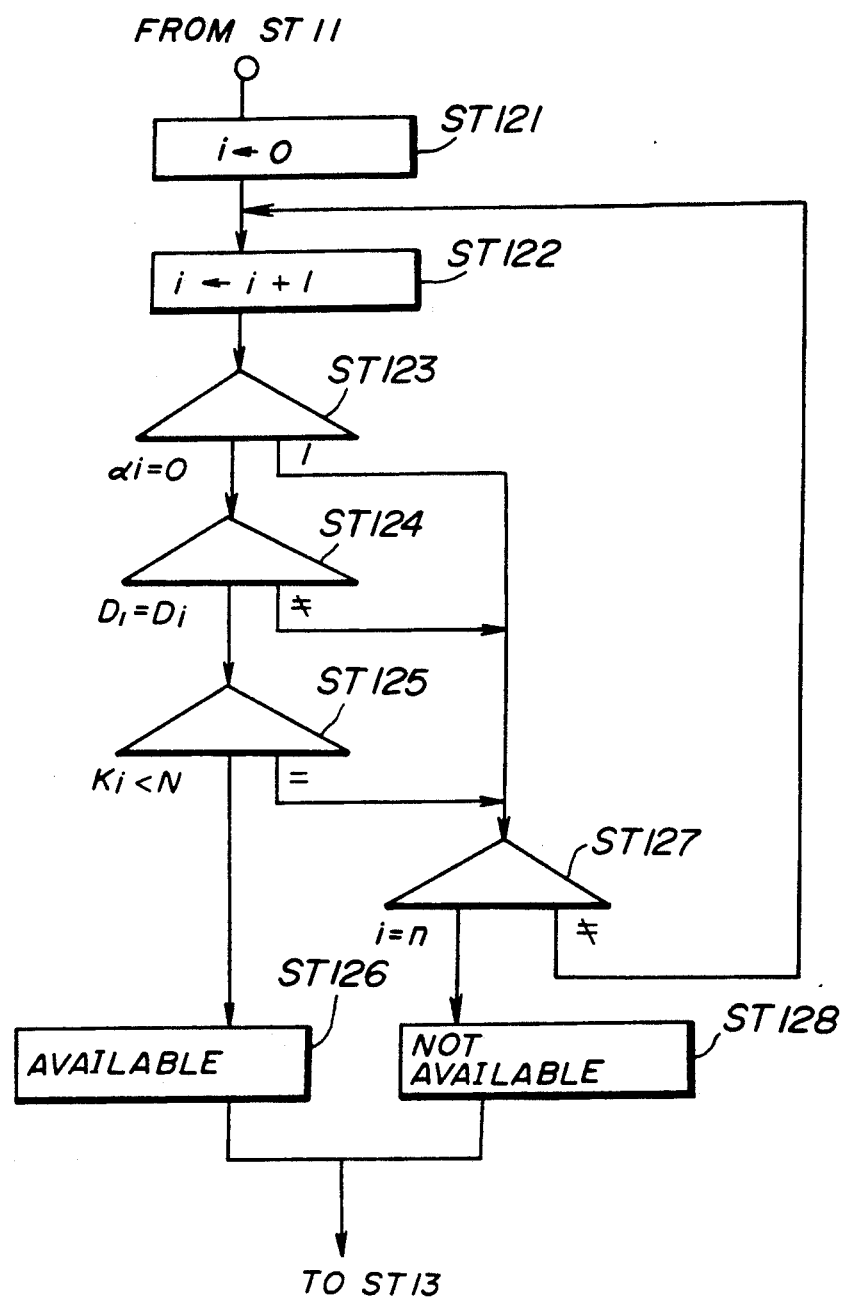
FIG. 9 is a flow chart showing a ST12 shown in FIG. 6 in more detail.

Next, a more detailed description will be given of the step ST12 shown in FIG. 6, by referring to FIG. 9. In FIG. 9, Di denotes a dial number to which the ith multiplexer 2 is connected, $K_i$ denotes the number of terminals 1 connected to the multiplexer 2 and N denotes a maximum number of terminals 1 which can be connected to the multiplexer 2.

In FIG. 9, an initializing step ST121 sets i to "0" and a step ST122 increments i. A step S123 discriminates whether the in-use flag $a_i$ is "0" or "1"; that is, whether the ith multiplexer 2 having the unit number $E_i$ is in use or not. When $a_b = 0$, a step ST124 discriminates whether Dl=Di or Dl<Di. When Dl=Di, a step ST125 discriminates whether $K_i < N$ or $K_i = N$. When $K_i < N$, a step ST126 discriminates that there exists a multiplexer 2 which is connected to the destination terminal 1 and is available, and the process to the step ST13 shown in FIG. 6.

On the other hand, when $a_i = 1$ in the step ST123, Dl≠Di in the step ST124 or $K_i = N$ in the step ST125, a step ST127 discriminates whether i=n or i≠n. When i=n, a step ST128 discriminates that there exists no multiplexer 2 which is connected to the destination terminal 1 and is available, and the process advances to the step ST13 shown in FIG. 6. The process returns to the step ST122 when i≠n in the step ST127.

Figure 10:
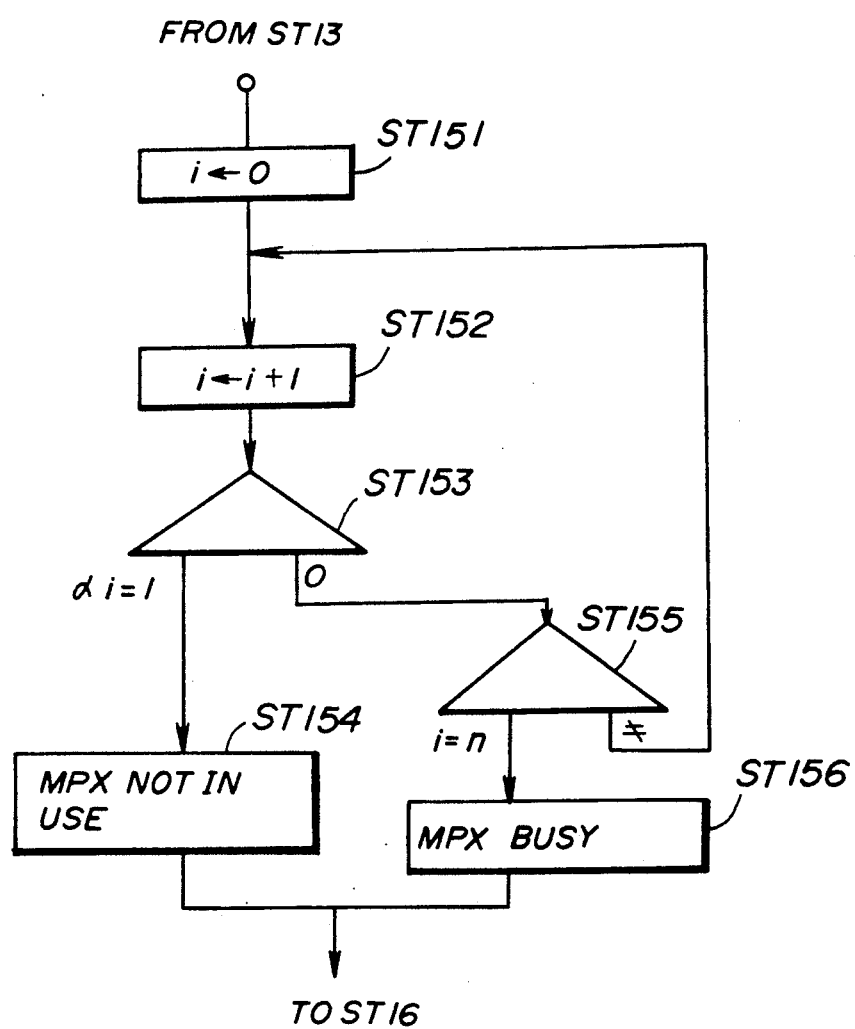
FIG. 10 is a flow chart showing step ST15 shown in FIG. 6 in more detail.

Next, a more detailed description will be given of the step ST15 shown in FIG. 6, by referring to FIG. 10. In FIG. 10, the same designations are used as in FIG. 9.

In FIG. 10, an initializing step ST151 sets i to "0" and a step ST152 increments i. A step S153 discriminates whether the in-use flag $a_i$ is "0" or "1"; that is, whether or not there exists a multiplexer 2 which is not in use. When $a_i = 1$ in the step ST153, a step ST154 discriminates that there exists a multiplexer 2 which is not in use, and the process advances to the step ST16 shown in FIG. 6.

On the other hand, when $a_i = 0$ in the step ST153, a step ST155 discriminates whether i=n or i≠n. When i=n, a step ST156 discriminates that there is no multiplexer 2 which is not in use; that is, all multiplexers 2 are busy, and the process advances to the step ST16 shown in FIG.6. When i≠n in the step ST155, the process returns to the step ST152.

When connecting an extension to the multiplexer 2 which is already using another extension in the first embodiment, the step ST12 shown in FIG. 6 discriminates whether or not the number of extensions will exceed the maximum number N of extensions which can be connected to the multiplexer 2. This method is effective when the maximum number N is fixed depending on the structure or the like of the multiplexer 2. For example, N=2 and fixed when the multiplexer 2 has two extension terminals for connecting extensions.

However, when N≧3, the number of extension terminals is not necessarily equal to the maximum number N. For example, in the case of a flexible format multiplexing in conformance with the CCITT recommendations I.460, such as the case where low-speed signals of 8, 16 and 32 kBPS are time-division-multiplexed to a 64 kBPS channel, the maximum number N is also limited by a condition other than the number of extension terminals. That is, the total communication speed of the low-speed signals must be less than or equal to 64 kBPS. For example, this means that when the multiplexer 2 has 8 extension terminals, 8 terminals 1 having the communication speed of 8 kBPS can be connected to the private branch exchange 5 in the 64 kBPS channel and 4 terminals 1 having the communication speed of 16 kBPS can be connected to the private branch exchange 5 in the 64 kBPS channel.

Figure 11:
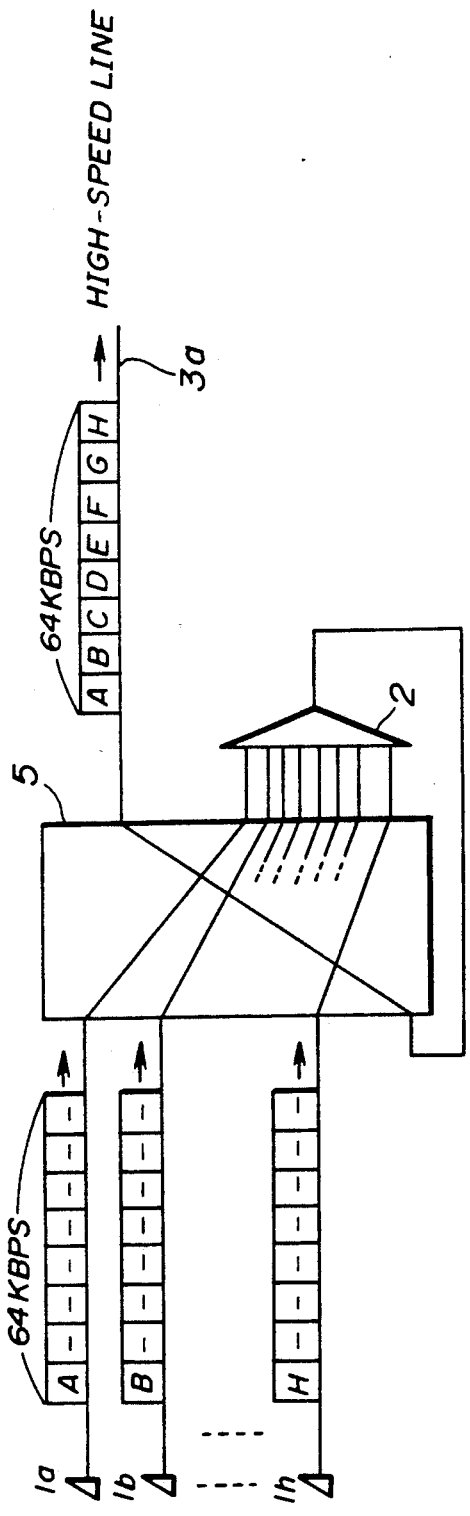
FIG. 11 is a system block diagram showing an essential part of a second embodiment of the communication terminal connection system according to the present invention when the terminals have a communication speed of 8 kBPS.
Figure 12:
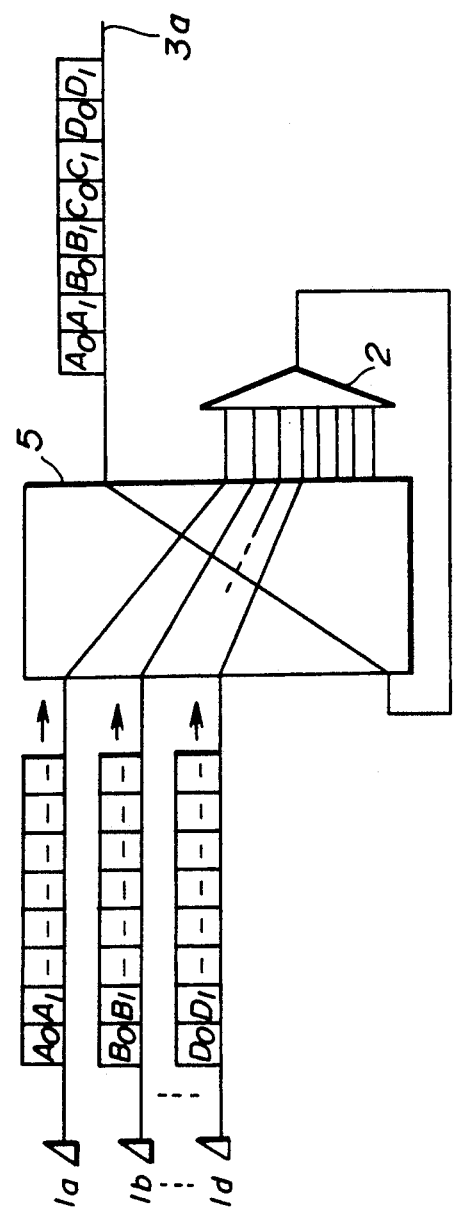
FIG. 12 is a system block diagram showing an essential part of the second embodiment of the communication terminal connection system according to the present invention when the terminals have a communication speed of 16 kBPS.

Next, a description will be given of a second embodiment of the communication terminal connection system according to the present invention, by referring to FIGS.11 and 12. In FIGS. 11 and 12, those parts which are the same as those corresponding parts in FIG. 4 are designated by the same reference numerals, and a description thereof will be omitted.

FIG. 11 shows an essential part of the second embodiment for the case where the multiplexer 2 has 8 extension terminals and 8 terminals 1a through 1hj respectively having a communication speed of 8 kBPS are connected to the private branch exchange 5. The channel assignment on the low-speed side and the high-speed side are made as shown, where A through H respectively denote 8 kBPS data from the extensions a through h of the terminals 1a through 1h.

FIG. 12 shows an essential part of the second embodiment for the case where the multiplexer 2 has 8 extension terminals and 4 terminals 1a through 1d respectively having a communication speed of 16 kBPS are connected to the private branch exchange 5. The channel assignment on the low-speed side and the high-speed side are made as shown, where AO through DO, A1 through D1, respectively denote 16 kBPS data from the extensions a through d of the terminals 1a through 1d. In this case, 4 extension terminals of the multiplexer 2 are not used.

In this embodiment, the multiplexer management table 71 manages the total communication speed of the terminals I which are connected to the multiplexer 2 instead of the number of terminals 1 which are connected to the multiplexer 2. FIG. 13 shows a data structure of data stored in the multiplexer management table 71. In FIG. 13, the "connected speed" data represents the total communication speed (kBPS) of the terminals 1 connected to the multiplexer 2

Figure 14:
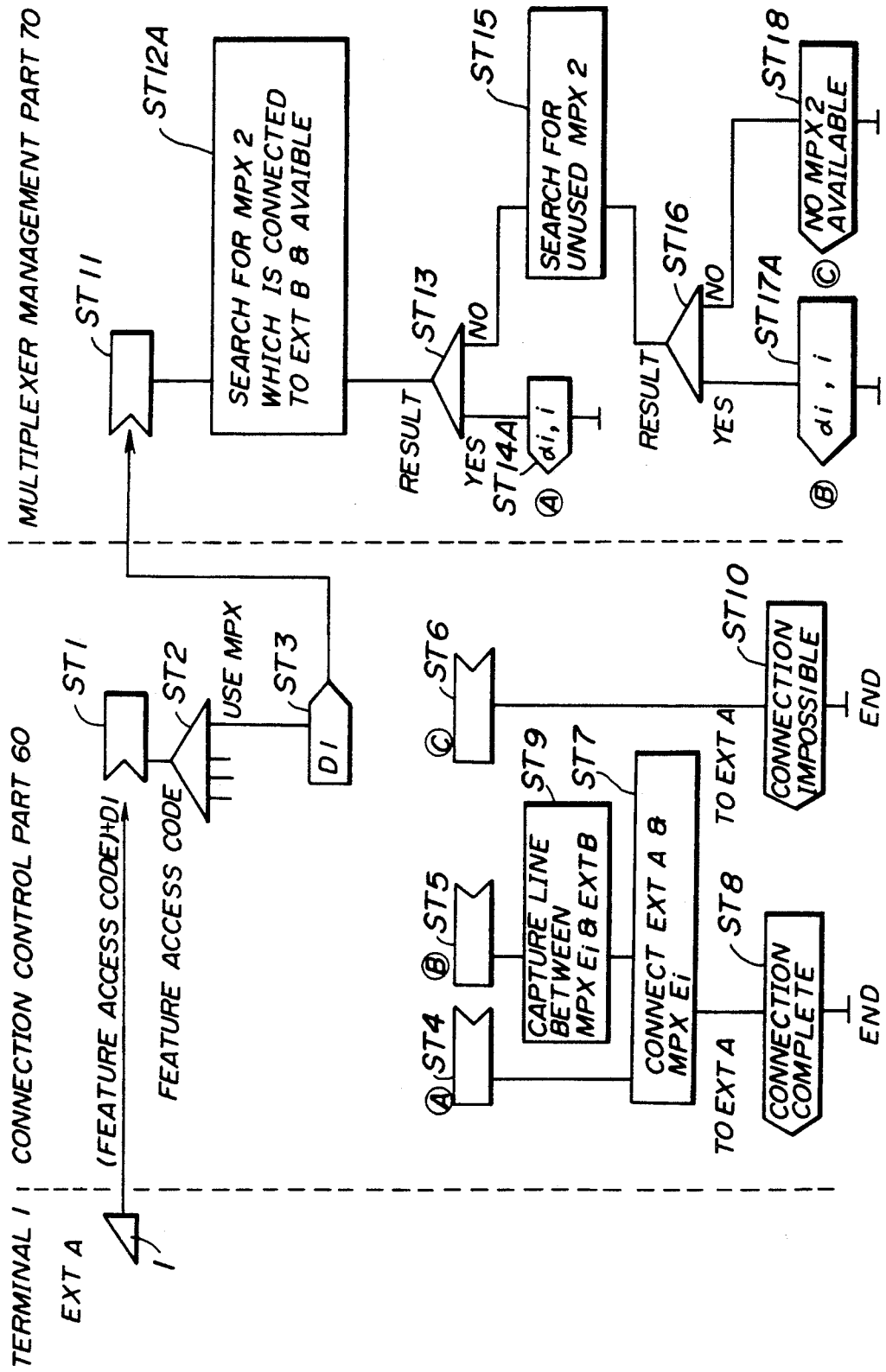
FIG. 14 is a flow chart showing a connection process between a source terminal and a public line during a call process.

FIG. 14 is a flow chart showing a connection process between the source terminal 1 and the public line 13a during a call process. In FIG. 14, those steps which are the same as those corresponding steps in FIG. 6 are designated by the same reference numerals, and a description thereof will be omitted. In FIG. 14, a step ST12A searches the multiplexer management table 71 for a multiplexer 2 which is connected to the terminal 1 having the dial number Dl and has connected thereto a number of terminals 1 such that a sum of the "connected speed" and the communication speed of the terminal 1 having the extension A is smaller than a maximum tolerable communication speed of 64 kBPS, for example. When the discrimination result in the step control part 60 the data on the unit number $E_i$ of the multiplexer 2 and the data on the in-use flag $\alpha_i$ of the multiplexer 2. The data on the in-use flag $\alpha_i$ is sent to the connection control part 60 to indicate that the multiplexer 2 can be used. In addition, the step adds the communication speed of the terminal 1 having the extension A to the "connected speed" data for the multiplexer 2 in the multiplexer management table 71 in synchronism with the transmission process.

On the other hand, when the discrimination result in the step ST16 is YES, a step ST17A sends to the connection control part 60 the data on the unit number $E_i$ of the multiplexer 2 and the data on the in-use flag $\alpha_i$ of the multiplexer 2. Similarly to the step ST14A described above, the step ST17A adds the communication speed of the terminal 1 having the extension A to the "connected speed" data for the multiplexer 2 in the multiplexer management table 71 in synchronism with the transmission process. The step ST17A also sets the in-use flag $\alpha_i$ to "0" to indicate that the multiplexer 2 is in use.

Figure 15:
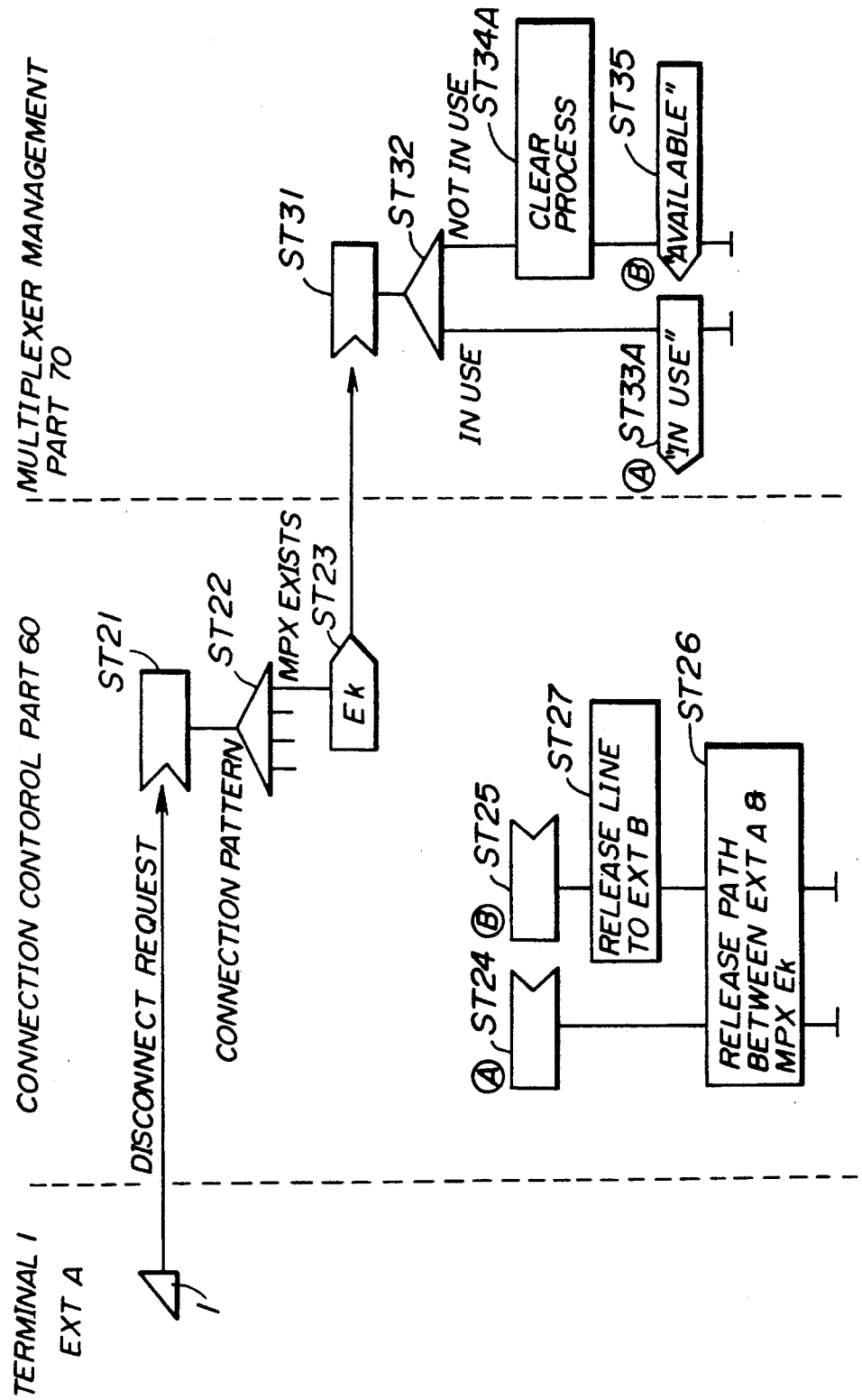
FIG. 15 is a flow chart showing a release process for releasing the connection between a destination terminal and the public line during the call process of the second embodiment.

FIG. 15 is a flow chart showing a release process for releasing the connection between the destination terminal 1 and the public line 3a during the call process of the second embodiment. In FIG. 15, those steps which are the same as those corresponding steps in FIG. 7 are designated by the same reference numerals, and a description thereof will be omitted. In FIG. 15, a step ST33A informs the connection control part 60 that the multiplexer 2 which has the unit number $E_k$ is in use. The step ST33A also subtracts the communication speed of the terminal 1 having the extension A from the "connected speed" data on the multiplexer 2 in the multiplexer management table 71 in synchronism with the transmission process. On the other hand, when the discrimination result in the step ST32 is NO, a step ST34A decrements and clears the "connected speed" data on the multiplexer 2 in the multiplexer management table 71 to "0" in synchronism with the transmission process.

Figure 16:
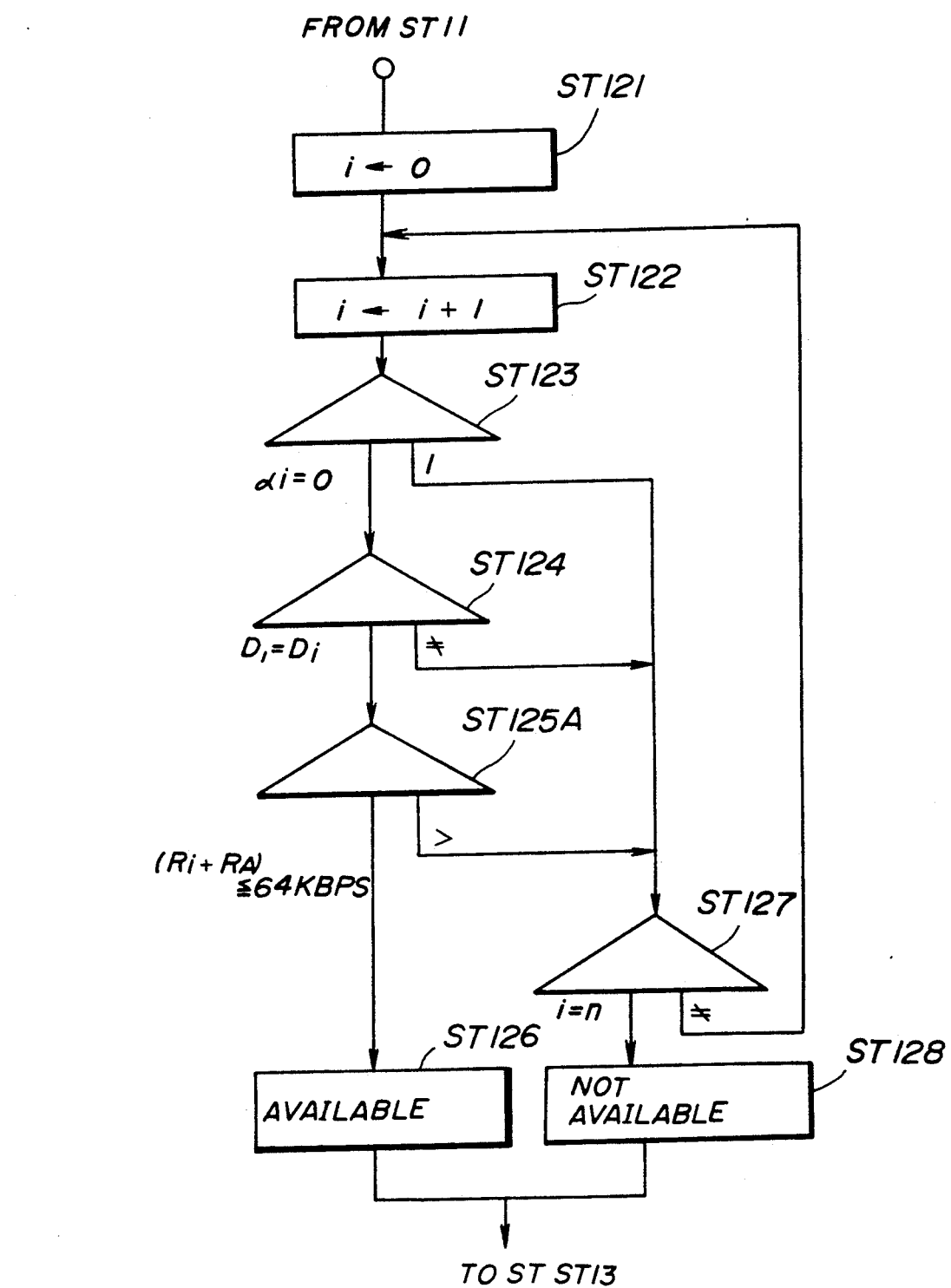
FIG. 16 is a flow chart showing a step ST12A in FIG. 14 in more detail.

Next, a more detailed description will be given of the step ST12A shown in FIG. 14, by referring to FIG. 16. In FIG. 16, $R_i$ denotes the total communication speed (kBPS) of the terminals 1 connected to the ith multiplexer 2 which has the unit number $E_i$, and $R_A$ denotes the communication speed (kBPS) of the terminal 1 which has the extension A and is to be connected to the ith multiplexer 2.

In FIG. 16, those steps which are the same as those corresponding steps in FIG. 9 are designated by the same reference numerals, and a description thereof will be omitted. In FIG. 16, a step ST125A discriminates whether $(R_i + R_A) \leq 64$ (kBPS) or $(R_i + R_A) > 64$ (KBPS). The process advances to the step ST126 when $(R_i + R_A) > 64$ (kBPS), and the process advances to the step ST127 when $(R_i + R_A) > 64$ (kBPS).

Of course, the communication speeds of the terminals 1 which are connected to the multiplexer 2 need not be the same in the second embodiment. The communication speeds of the terminals which are connected to the multiplexer 2 may be different as long as the total communication speed of the terminals 1 do not exceed 64 kBPS, for example.

In addition, the communication terminal connection system according to the present invention is applicable to both analog lines and digital lines.

Further, the present invention is not limited to these embodiments, but various variations and modifications may be made without departing from the scope of the present invention.

What is claimed is:

1. A communiction terminal connection system for coupling at least one of first communication terminals, each providing request-to-use information and a respective destination identification number to a second communication terminal having a respective one of the destination identification numbers via a line, comprising:

a plurality of multiplexers each having an identification number;

channel switch means for operatively connecting said first communiction terminals to at least one of said multiplexers and control means operatively coupled to said channel switch means, for switching and controlling a connection of said channel switch means, said control means including first detection means for detecting request-to-use information from one of said first communiction termainls and for requesting use of said one of said multiplexers;

second detection means, operatively coupled to said first detection means, for detecting an identification number of said one of said multiplexer that is coupled via the line when said first detection means detects the request-to-use information; and connection means for detecting the destination identification number of said second communication terminal and for controlling said channel switch means to couple said one of said first communication termainsl to said one of said multiplexers when the destination identification number matches the identification number detected by said second means, so as to couple said one of said first communication termainsl to said second communication terminal via the line.

2. The communication terminal connection system as claimed in claim 1, wherein said channel switch means is coupled between said multiplexer and the line.

3. The communication termainl connection system as claimed in claim 1, further comprising:

a plurality of other lines, and wherein said channel switch means is coupled to said plurality of other lines.

4. The communication terminal connection system as claimed in claim 1, wherein each of said multiplexers has a connectable capacity; and wherein said connection means of said control means includes:

means for controlling said channel switch means to couple said one of said first communiction terminals to said one of said multiplexers when the connectable capacity of said one of said multiplexers is not exceeded.

5. The communication terminal connection system as claimed in claim 4, wherein said connection means of said control means includes:

means for controlling said channel switch means to couple said one of said first communication terminals to said another multiplexer which is different from said one of said multiplexers when the connectable capacity of said one of said multiplexers is exceeded.

6. The communication terminal connection system as claimed in claim 5, wherein the respective connectable capacities of each of said multiplexers corresponds to a maxiumu number of said first communication terminals which can be coupled to said multiplexer.

7. The communication terminal connection system as calimed in claim 5, wherein the respective connectable capacities of each of said multiplexers corresponds to a maximum number of first communications terminal which can be coupled to said multiplexer and which ahve a total communication speed of low-speed signals which are transmitted from said first communication terminals.

8. The communication terminal connection system as claimed in claim 1, wherein each of said first communication termainsl including means for communicating at identical communication speeds.

9. the communication terminal connection system as claimed in claim 1, wherein each of said first communication terminals includes means for communicating at respective communication speeds.

10. The communication terminal connection system as claimed in claim 1, wherein the line comprises an analog line.

11. The communication terminal connection system as claimed in claim 1, wherein the line comprises a digital line.

12. The communication terminal connection system as claimed in claim 1, which further comprises:
an interface circiut coupled between each of said first communication terminals and said channel switch means.

13. The communication terminal connection system as claimed in claim 1, which further comprises:
an interface circiut coupled between said plurality of multiplexers and said channel switch means.

14. The communication terminal connection system as claimed in claim 1, which fruther comprises:
a trunk coupled between said channel switch means and the line.

15. The communication terminal connection system as claimed in claim 1, wherein said channel switch means and said control means form a part of a private branch exchange.

16. The communication terminal connection system as claimed in claim 1, wherein said second detection means of said control means includes:
multiplexer management table means for storing unit number data, in-use flag data, connected dial number dta and connected number data for each of said plurality of multiplexers, said unit number data representing the unit number for each of said multiplexers in use, said connected dial number data representing a dial number to which said one of said multiplexers in use is coupled, said connected number data representing a number of first communication termainls which are coupled to said plurality of multiplexers, said one of said multiplexer is use forming at least a portion of a path which connects said one of said first communication terminals and said one of said second communiction terminals.

17. The communication terminal connection system as claimed in claim 1, wherein said second detection means of said control means includes:
multiplexer meanagement table means for storing unit number data, in-use flag data, connected dial number data and connected speed data for each of said plurality of multiplexers, said unt number data representing the unit number for each of said multiplexers, said in-use flag data representing whether or not said one of said multiplexers in use, said connected dial number data representing a dial number to which said one of said multiplexers in use is coupled, said connected speed dat representing a total communication speed of said first communication terminals which are coupled to said plurality of multiplexers, said one of said multiplexers in use forming at least a portion of a path which connects said one of said first communication terminals and said one of said second communication terminals.

18. The communication terminal connection system as claimed in claim 1, wherein the line couples to an integrated services digital network.

19. The communication terminal connection system as claimed in claim 1, wherein said reuesttouse information comprises: one of a feature access code and a call set up message.

20. The communication terminal connection system as claimed in claim 1, wherein said first communication terminal comprises a low-speed communiction terminal and wherein said line comprises a high-speed communication terminal.

21. The communication terminal connection system as claimed in claim 1, wherein said second detection means includes:
multiplexer meanagement table means for storing unit number data, in-use flag data, connected dial number data and connected number data for each of said plurality of multiplexers.

22. The communication terminal connection system as claimed in claim 1, wherein said detection means includes:
multiplexer management table means for storing unit number data, in-use flag data, connected dial number data and connected speed data for each of said plurality of multiplexers.

* * * * *

UNITED STATES PATENT AND TRADEMARK OFFICE
CERTIFICATE OF CORRECTION

PATENT NO. : 5,086,424

DATED : February 4, 1992         PAGE 1 of 2

INVENTOR(S) : Motohashi et al.

It is certified that error appears in the above-identified patent and that said Letters Patent is hereby corrected as shown below:

Col. 2,   line 60, "illustrating" should be --multiplexers;--;
          line 61, "for-explaining" should be --for illustrating--.

Col. 3,   line 35, delete "a" (second occurrence).

Col. 4,   line 10, after "source" insert --terminal 1 to the multiplexer 2 which is connected--.

Col. 5,   line 49, "4, is in use whether or not multiplexer 2" should be --4. Whether or not multiplexer 2 is in use is--;
          line 50, delete "15".

Col. 6,   line 25, "receiver" should be --receives--.

Col. 7,   line 57, "fultiplexer" should be --multiplexer--.

Col. 8,   line 12, "ween+" should be --tween--.

Col. 9,   line 5, "5 and" should be --1--;
          line 8, after "2" insert --having the--.
          line 30, "D1<Di" should be --D1≠Di--;
          line 34, after "process" insert --advances--.

Col. 10,  line 30, "1hj" should be --1h--;
          line 43, "A0 through D0," should be --A$\phi$ through DA$\phi$,--.

UNITED STATES PATENT AND TRADEMARK OFFICE
CERTIFICATE OF CORRECTION

PATENT NO. : 5,086,424

DATED : February 4, 1992

INVENTOR(S) : Motohashi et al.

It is certified that error appears in the above-identified patent and that said Letters Patent is hereby corrected as shown below:

Col. 11, line 2, after "step" insert --ST13 is YES, a step ST14A sends to the connection--;
line 7, after "step" insert --ST14A--;
line 56, "KBPS" should be --kBPS--;
line 57, "$(R_i+R_A)>64$" should be --$(R_i+R_A) \leq 64$--.

Col. 12, line 36, "termainsl" should be --terminals--;
line 40, "termainsl" should be --terminals--.

Col. 13, line 16, "termainsl" should be --terminals--;
line 18, "the" should be --The--.

Col. 14, line 2, "termainls" should be --terminals--;
line 3, "is" should be --in--;
line 32, "reuesttouse" should be --request-to-use--.

Signed and Sealed this

Twenty-fifth Day of January, 1994

BRUCE LEHMAN

Attest:

Attesting Officer

Commissioner of Patents and Trademarks